United States Patent
Koch et al.

(10) Patent No.: US 6,958,410 B2
(45) Date of Patent: Oct. 25, 2005

(54) AMIDO-FUNCTIONAL AMINOPOLYDIORGANOSILOXANES

(75) Inventors: Matthias Koch, Bremen (DE); Friedhelm Nickel, Hellwege (DE); Konrad Nodstadt, Reutlingen (DE)

(73) Assignee: CHT R. Beitlich GmbH, Tübigen (DE)

( * ) Notice: Subject to any disclaimer, the term of this patent is extended or adjusted under 35 U.S.C. 154(b) by 200 days.

(21) Appl. No.: 10/475,110

(22) PCT Filed: Apr. 24, 2002

(86) PCT No.: PCT/EP02/04482

§ 371 (c)(1),
(2), (4) Date: Apr. 22, 2004

(87) PCT Pub. No.: WO02/088456

PCT Pub. Date: Nov. 7, 2002

(65) Prior Publication Data

US 2004/0186308 A1 Sep. 23, 2004

(30) Foreign Application Priority Data

Apr. 27, 2001 (DE) .......................... 101 20 754

(51) Int. Cl.$^7$ ................................. C07F 7/04
(52) U.S. Cl. ................ 556/419; 556/420; 556/421; 558/28; 252/8.61; 252/8.81; 106/287.11
(58) Field of Search ................ 556/419, 420, 556/421; 528/28; 252/8.81, 8.61; 106/287.11

(56) References Cited

U.S. PATENT DOCUMENTS

| 4,104,296 A | 8/1978 | Pike |
| 4,591,652 A | 5/1986 | DePasquale et al. |
| 5,100,991 A | 3/1992 | Cray et al. |

FOREIGN PATENT DOCUMENTS

| DE | 41 31 551 A1 | 3/1993 |
| DE | 43 18 536 A1 | 12/1994 |
| DE | 198 54 186 A1 | 5/2000 |
| EP | 0 335 407 A2 | 10/1989 |
| EP | 1 033 434 A3 | 9/2000 |
| EP | 1 081 272 A2 | 3/2001 |

OTHER PUBLICATIONS

Kanekura et al., "High Molecular Emulsfier", Japanese Abstract, Publication No. 01099640 A, Date of Publication—Apr. 18, 1989, p. 1.

Ishikawa, "Lighting Structure of Image Scanner", Japanese Abstract, Publication No. 06268820 A, Date of Publication—Sep. 22, 1994, p. 1.

*Primary Examiner*—Samuel Barts
(74) *Attorney, Agent, or Firm*—Venable LLP; Thomas G. Wiseman

(57) ABSTRACT

The invention relates to amido-functional aminopolydiorganosiloxanes, a method for the preparation thereof, formulations containing such amido-functional aminopolydiorganosiloxanes, and the use thereof.

11 Claims, No Drawings

AMIDO-FUNCTIONAL AMINOPOLYDIORGANOSILOXANES

The invention relates to amido-functional aminopolydiorganosiloxanes, a method for the preparation thereof, formulations containing such amido-functional aminopolydiorganosiloxanes, and the use thereof.

The patent specification U.S. Pat. No. 4,591,652 relates to polyhydroxysilanes or siloxanes which are employed as supports for coatings of metal, mineral or glass surfaces. The polyhydroxy compounds described are prepared by the reaction of a silane or a terminally amino-substituted siloxane with aldonic acid lactones, gluconic acid lactone being preferred. The reaction is performed in alcoholic solution. The products formed therein are water-soluble and will polymerize at elevated temperatures to form rigid, water-insoluble, firmly adhering films.

The patent specification U.S. Pat. No. 4,104,296 describes organo-functional silicone components with hydroxyalkylamido functions which are linked to the silicone chain through one divalent hydrocarbyl residue having at least three carbon atoms. The silicone components are prepared through the reaction of an aminoalkylsilane or -siloxane with a lactone derived from a β-hydroxycarboxylic acid with a chain length of from $C_3$ to $C_9$. These components are supposed to improve the adhesion of various resins to inorganic substrates.

If the polyhydroxysilanes or silicone components having hydroxyalkyl functionalities as described in the above mentioned patent specifications U.S. Pat. No. 4,591,652 and U.S. Pat. No. 4,104,296 are employed as finishing agents for textile fibers or fibrous materials rather than for the surface modification of metal, mineral or glass surfaces, then the resinous, highly cross-linked reaction products do not meet the desired requirements in terms of soft feel properties.

The patent specification U.S. Pat. No. 5,100,991 describes amido-functional polyorganosiloxanes prepared by the reaction of amino-functional polyorganosiloxanes with lactones. Preferred lactones comprise materials derived from monohydroxy acids, such as γ-butyrolactone and ε-caprolactone, which are reacted with the amino-functional polyorganosiloxanes with heating. It is noted that the reaction is preferably performed without a solvent, but may also be performed in solvents such as methyl ethyl ketone, toluene or ethanol, or optionally in aqueous emulsions. However, in this case, a significant loss of yield must be expected because the lactones described, when in an aqueous medium, will hydrolyze to the corresponding hydroxycarboxylic acid, which no longer reacts with the amino-functional polyorganosiloxanes under the conditions described.

EP 1 033 434 A1 describes a fiber treatment composition containing amido-functional polyorganosiloxanes in combination with an alkyl sulfate salt of a benzimidazoline compound. In the preparation of the compounds, lactones are employed for solubilizing the alkyl sulfate salts of the benzimidazoline compound which are consumed during the reaction. Preferred lactones comprise γ-butyrolactone and ε-caprolactone, for example. In the description, it is noted that the lactone is to be added to the above mentioned compound in such an amount that from 30 to 70 mole percent of the amino functions of the amino-functional polysiloxanes is converted to amide bonds. It is further noted that a deterioration of the softener effect of the composition may occur in the case where more than 70% of the amino functions of the amino-functional polysiloxanes react.

EP 1 081 272 A1 relates to a fiber-treatment composition which contains either a mixture of a) from 50 to 99% by weight of amino/polyol-functional siloxanes and b) from 1 to 50% by weight of polyol/amido-functional siloxanes, or amino/polyol/amido-functional siloxanes as active ingredients. In the preparation of the compounds, amino-functional siloxanes are reacted with epoxy-functional compounds and lactones, γ-butyrolactone and ε-caprolactone being preferred. It is further noted that the combination of amino, polyol and amido functions showed synergistic effects which improve the yellowing properties and the hydrophilicity without drastic adverse effects on the feel.

The reaction products of aminosiloxanes with lactones and optionally epoxy compounds or their formulations with alkyl sulfate salts of a benzimidazoline compound as claimed for fiber treatment according to the patents U.S. Pat. No. 5,100,991, EP 1 033 434 A1 and EP 1 081 272 A1 yield an improvement in terms of whiteness and hydrophilicity, but at the expense of shear stability and soft feel property, especially if the finishing is effected on fast running dyeing apparatus.

JP 62 68,820 (CA 1988, vol. 108, No. 8, 56828s) describes the preparation of siloxanes with at least one sugar residue suitable for use, inter alia, in non-ionic surface-active agents or cosmetic preparations. They are prepared by reacting siloxanes having at least one primary amino group with lactones derived from the intramolecular dehydrocyclization of aldonic or uronic acids. In view of their use as a surfactant, it is considered that a complete conversion of all amino groups has taken place.

DE 43 18 536 A1 describes siloxane-modified compounds, the preparation thereof and the use thereof as surface-modifying agents, especially in plant protection, or for the preparation of surface-active and surface-modifying agents. Part of the siloxane chain members bear spacer-bound mono- or oligosaccharides, which may in turn have amino or amido functions. These compounds are prepared in a complicated two-step process. By analogy with JP 62 68,820, the spacers bearing amino groups are always sugar-functionalized. Thus, a positive influence of the amino groups, especially of primary amines, on the soft feel property and substantivity cannot be achieved because of steric hindrance by polyhydroxylated hydrocarbons.

EP 1 081 272 A1 relates to siloxanes which have amino, polyol and amido functions, as well as to fiber treatment agents containing same. The disclosed siloxane skeletons are linked with the polyol units through amino groups which are difficult to realize in synthesis. Linking of the polyol units with the siloxane skeleton through amido bridges is not disclosed.

EP 0 335 407 A2 deals with polyolefin compositions which may be extruded into film material. They are characterized by an improved stability and optical properties. In particular, compositions are described which contain polyorganosiloxanes with hydroxy functions. Linked to a spacer and the siloxane chain are either terminal dihydroxyalkanes through an ether bridge or terminal monohydroxyalkanes through an amino function. Mono- or oligohydroxycarboxylic acids bonded to an amino function with is easily realized in synthesis are not disclosed.

DE 198 54 186 A1 discloses surface-active organosilicon compounds which are modified with mono- or polyhydroxylated hydrocarbon residues or carbohydrate derivatives. The polyhydroxylated hydrocarbon residue or carbohydrate residue is always in a non-oxidized form and necessarily linked through a glycosidic bond with the spacer bonded to the polysiloxane skeleton. However, glycosidic bonds have a disadvantage, inter alia, in that they can be realized completely and selectively only with great experimental difficulty and, in addition, their stability highly depends on the pH value of the medium.

JP 01-099 640 A discloses polymeric emulsifiers based on polysiloxanes which may contain hydroxy groups and serve for the preparation of dyes due to their low sensitivity towards pH, solvents, ions, heat and hydrolysis. These polysiloxanes do not contain any sterically unhindered, for example primary, amino groups and therefore have low or no permanence on textiles and are unsuitable for conferring soft feel properties to textiles.

It was the object of the present invention to provide amido-functional amino-polydiorganosiloxanes, especially for a finishing agent, which exhibits a high yellowing resistance in addition to improved soft feel properties and can be applied on high-shear application systems without difficulty.

In a first embodiment, the invention relates to amido-functional aminopolydiorganosiloxanes of general formula (I)

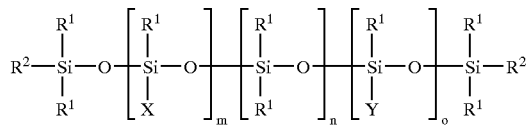

(I)

wherein $R^1$ represents the same or different monovalent $C_1$ to $C_{18}$ hydrocarbon residues optionally substituted with fluoro, chloro or bromo, hydrogen atoms, $C_1$ to $C_{12}$ alkoxy or hydroxy residues or alkylglycol residues;

$R^2$ represents $R^1$ and/or one of the groups X and/or Y;

X represents a group of general formula (II) and/or (III)

—$R^3$NZ$R^4$ (II)

—$R^3$N$R^5$(CH$_2$)$_p$NZ$R^4$ (III)

wherein $R^3$ represents a divalent $C_1$ to $C_{18}$ hydrocarbon residue;

$R^4$ represents a hydrogen atom or a $C_1$ to $C_{10}$ alkyl residue optionally substituted with fluoro, chloro or bromo;

Z is derived from hydroxycarboxylic acids and oxidized mono- and disaccharides, each having at least 2 hydroxy groups;

$R^5$ represents a hydrogen atom and/or Z;

Y represents a group of general formula (IV) and/or (V)

—$R^3$NH$R^4$ (IV)

—$R^3$NH(CH$_2$)$_p$NH$R^4$ (V)

wherein $R^3$ and $R^4$ have the above mentioned properties;

m has an average value of from 0.5 to 50;

n has an average value of from 10 to 1500;

o has an average value of from 0 to 50; and p represents the values 2, 3 or 4;

with the proviso that the ratio of m to o is within a range of from 10:1 to 0.1:1.

Examples of $C_1$–$C_{18}$ hydrocarbon residues $R^1$ include alkyl residues, such as methyl, ethyl, n-propyl, iso-propyl, n-butyl, iso-butyl, tert-butyl, n-pentyl, neo-pentyl, tert-pentyl residues, hexyl residues, heptyl residues, such as n-heptyl residue, octyl residues and iso-octyl residues, such as 2,2,4-trimethylpentyl residue, nonyl residues, such as n-nonyl residue, decyl residues, such as n-decyl residue, dodecyl residues, such as n-dodecyl residue, cycloalkyl residues, such as cyclopentyl, cyclohexyl, cycloheptyl residues and methylcyclohexyl residues, aryl residues, such as phenyl and naphthyl residues, alkaryl residues, such as o-, m-, p-tolyl residues, xylyl residues and ethylphenyl residues, aralkyl residues, such as benzyl residue, α- and β-phenylethyl residue.

The above hydrocarbon residues optionally contain an aliphatic double bond. Examples thereof are alkenyl residues, such as vinyl, allyl, 5-hexen-1-yl, E-4-hexen-1-yl, Z-4-hexen-1-yl, 2-(3-cyclohexenyl)ethyl and cyclododeca-4,8-dienyl residues. Preferred residues with an aliphatic double bond are the vinyl, allyl and 5-hexen-1-yl residues. Preferably, however, at most 1% of the hydrocarbon residues $R^1$ contain a double bond.

Examples of $C_1$ to $C_{18}$ hydrocarbon residues substituted with fluorine, chlorine or bromine atoms include the 3,3,3-trifluoro-n-propyl residue, the 2,2,2,2',2',2'-hexafluoroisopropyl residue, the heptafluoroisopropyl residue and the o-, m- and p-chlorophenyl residues.

Examples of $C_1$ to $C_{10}$ alkyl residues $R^4$ include the examples of linear and cyclic alkyl residues and $C_1$ to $C_{10}$ alkyl residues substituted with fluorine, chlorine or bromine atoms as stated above for $R^1$.

Examples of the divalent $C_1$ to $C_{18}$ hydrocarbon residues $R^2$ are saturated linear or branched-chain or cyclic alkylene residues, such as methylene and ethylene residues as well as propylene, butylene, pentylene, hexylene, 2-methylpropylene, cyclohexylene and octadecylene residues, or unsaturated alkylene or arylene residues, such as hexenylene residue and phenylene residue, wherein the n-propylene residue and the 2-methylpropylene residue are particularly preferred. The alkoxy residues are the above described alkyl residues bonded through an oxygen atom. All the examples stated for alkyl residues also apply to alkoxy residues.

The alkylglycol residues $R^1$ preferably have the general formula (X)

—$R^3$—[O(CHR$^4$)$_2$]$_q$O$R^7$ (X)

in which $R^3$ and $R^4$ have the same meaning as above, q has a value of from 1 to 100, and $R^7$ represents a hydrogen atom, a residue $R^4$ or a group of general formula

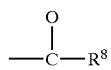

wherein $R^8$ represents the residue $R^4$ or O—$R^4$.

The group Z represents residues which are derived from hydroxycarboxylic acids and oxidized mono- and disaccharides with at least 2 hydroxy groups. Preferred are oxidized monosaccharides, such as uronic, aldaric and aldonic acids of general formulas (VI), (VII) and (VIII), respectively:

O=CH—[CH(OH)]$_s$—CO— (VI)

HOOC—[CH(OH)]$_s$—CO— (VII)

HOCH$_2$—[CH(OH)]$_s$—CO— (VIII), with 2≦s≦10.

Examples of group Z include residues of mevalonic acid, galacturonic acid, glucuronic acid, L-iduronic acid, galactaric acid, glucaric acid, gluconic acid, mannonic acid, 2-keto-L-gulonic acid and residues derived from formulas (XI) and (XII)

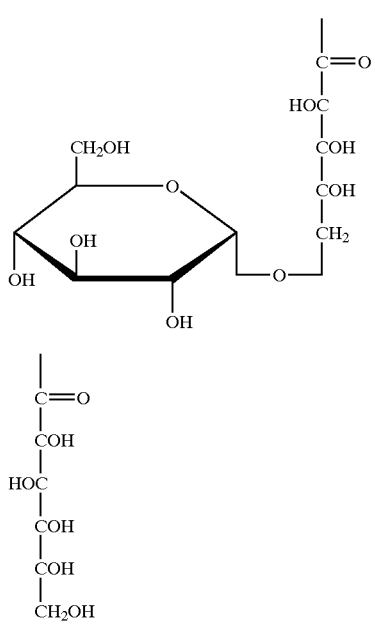

(XI)

(XII)

Lactones which are solid at room temperature are more preferably employed according to the present invention.

In the above general formulas (I) to (V) and (X), preferably and independently:

$R^1$ represents a methyl, phenyl, $C_1$–$C_3$ alkoxy or hydroxy residue or a residue of general formula (X);

$R^2$ represents a residue $R^1$;

$R^3$ represents a divalent $C_2$–$C_6$ hydrocarbon residue;

$R^4$ represents a hydrogen atom or a $C_2$ to $C_6$ alkyl residue;

m has a value of from 0.5 to 10;

n has a value of from 40 to 600;

o has a value of from 0 to 10; and p has a value of 2.

Those amido-functional aminopolydiorganosiloxanes in which the ratio of m to o is within a range of from 5:1 to 1:1 are particularly preferred.

Another embodiment of the present invention consists in the preparation of the above mentioned amido-functional polydiorganosiloxanes by reacting an amino-functional polydiorganosiloxane of general formula (IX)

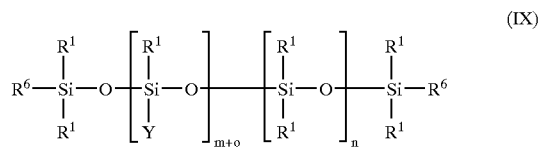

(IX)

wherein $R^1$ represents the same or different monovalent $C_1$ to $C_{18}$ hydrocarbon residues optionally substituted with fluoro, chloro or bromo, hydrogen atoms, $C_1$ to $C_{12}$ alkoxy or hydroxy residues or alkylglycol residues;

$R^6$ represents $R^1$ and/or a group Y;

Y represents a group of general formula (IV) and/or (V)

  (IV)

  (V)

wherein $R^3$ represents a divalent $C_1$ to $C_{18}$ hydrocarbon residue;

$R^4$ represents a hydrogen atom or a $C_1$ to $C_{10}$ alkyl residue optionally substituted with fluoro, chloro or bromo;

m has an average value of from 0.5 to 50;

n has an average value of from 10 to 1500;

o has an average value of from 0 to 50; and p represents the values 2, 3 or 4;

with the proviso that the ratio of m to o is within a range of from 10:1 to 0.1:1;

optionally in the presence of a solvent, with a lactone of a hydroxycarboxylic acid with at least 2 hydroxy groups at temperatures within a range of from 10 to 150° C.

Examples of $R^1$, $R^3$, $R^4$, m, n, o and p are the same as described above.

In the above general formulas (IX), (IV) and (V), preferably and independently:

$R^1$ represents a methyl, phenyl, $C_1$–$C_3$ alkoxy or hydroxy residue or a residue of general formula (X);

$R^6$ represents a residue $R^1$;

$R^3$ represents a divalent $C_2$–$C_6$ hydrocarbon residue;

$R^4$ represents a hydrogen atom or a $C_2$ to $C_6$ alkyl residue;

m has a value of from 0.5 to 10;

n has a value of from 40 to 600;

o has a value of from 0 to 10; and p has a value of 2.

Preferred amino-functional aminopolydiorganosiloxanes of general formula (IX) are linear polydimethylsiloxanes optionally having $C_1$ to $C_3$ alkoxy or hydroxy groups.

The content of titrable nitrogen is preferably w(N)=0.01 to 2%, especially 0.1 to 1%.

The amino-functional aminopolydiorganosiloxanes of general formula (IX) preferably have an average viscosity of from 50 to 100,000 mPa·s, especially from 100 to 15,000 mPa·s at 25° C. The reaction may optionally be performed in the presence of a suitable solvent. Preferred are polar solvents, such as alcohols or ketones, example of which are methanol, ethanol, propanol, isopropanol, acetone or ethyl methyl ketone. Preferably, the reaction is performed at temperatures within a range of from 40 to 120° C., depending on the solvent employed.

The amido-functional aminopolydiorganosiloxanes of general formula (I) (component A) are preferably employed in the form of aqueous formulations, especially emulsions. Based on the total composition, these contain from 2 to 80% by weight of one or more amido-functional aminopolydiorganosiloxanes of general formula (I). A suitable process for the preparation of emulsions of finely divided polydiorganosiloxanes has been known, for example, from U.S. Pat. No. 5,302,657. In this patent, the emulsion is prepared with an emulsifier soluble in the polydiorganosiloxane in two steps, wherein the first step yields a concentrate which is diluted with water in the second step.

As emulsifiers (component B), any emulsifiers can be employed which can be used for the preparation of amido-functional aminopolydiorganosiloxane formulations, especially emulsions. These formulations, especially emulsions, contain from 2 to 40% by weight of one or more emulsifiers, based on the total composition.

Particularly suitable anionic emulsifiers include:

1. Alkyl sulfates, especially those having a chain length of from 8 to 18 carbon atoms, and alkyl ether sulfates with from 8 to 18 carbon atoms in the hydrophobic residue and from 1 to 40 ethylene oxide (EO) or propylene oxide (PO) units.

2. Sulfonates, especially alkyl sulfonates with from 8 to 18 carbon atoms, taurides, esters and half-esters of sulfosuccinic acid with monohydric alcohols or alkylphenols with from 4 to 15 carbon atoms; optionally, these alcohols or alkylphenols may also be ethoxylated with from 1 to 40 EO units.
3. Alkali and ammonium salts of carboxylic acids having from 8 to 20 carbon atoms with an alkyl, aryl, alkylaryl or aralkyl residue.
4. Phosphoric acid partial esters and their alkali and ammonium salts, especially alkyl and alkylaryl phosphates with from 8 to 20 carbon atoms in the organic residue, alkyl ether or alkaryl ether phosphates with from 8 to 20 carbon atoms in the alkyl or alkaryl residue and from 1 to 40 EO units.

Particularly suitable non-ionic emulsifiers include:

1. Alkyl polyglycol ethers, preferably those with from 4 to 40 EO units and alkyl residues of from 8 to 20 carbon atoms.
2. Alkyl aryl polyglycol ethers, preferably those with from 4 to 40 EO units and alkyl residues of from 8 to 20 carbon atoms in the alkyl and aryl residues.
3. Ethylene oxide/propylene oxide (EO/PO) block polymers, preferably those with from 4 to 40 EO or PO units.
4. Fatty acids with from 6 to 24 carbon atoms.
5. Natural substances and their derivatives, such as lecithin, lanolin, saponins, cellulose; cellulose alkyl ethers and carboxyalkylcelluloses, whose alkyl groups respectively contain up to 4 carbon atoms.
6. Linear polydiorganosiloxanes containing polar groups, especially linear polydiorganosiloxanes containing polyether groups.
7. Saturated and unsaturated alkoxylated fatty amines having from 8 to 24 carbon atoms.

Particularly suitable cationic emulsifiers include:

8. Salts of primary, secondary and tertiary fatty amines with from 8 to 24 carbon atoms with acetic acid, hydrochloric acid and phosphoric acid.
9. Quaternary alkylbenzeneammonium salts, especially those whose alkyl group has from 6 to 24 carbon atoms, especially the halides, sulfates, phosphates and acetates.
10. Alkylpyridinium, alkylimidazolinium and alkyloxazolinium salts, especially those whose alkyl chain has up to 18 carbon atoms, especially the halides, sulfates, phosphates and acetates.

Suitable emulsifiers for the preparation of the emulsions further include fatty acid polyglycol esters, polyethoxylated fatty acid glycerides and sorbitan esters, alkyl polyglycosides, fatty acid alkylol amides, alkyl ether carboxylic acids, alkaryl ether carboxylic acids, ethoxylated quaternary ammonium salts, amine oxides, betains, sulfobetains and sulfosuccinates.

Optionally, a component C), an organic hydrotropic agent, can be employed in an amount of from 0 to 20% by weight, based on the total composition. "Hydrotropic agent" means a substance which improves the water-solubility of a hardly soluble substance and thus acts as a solubilizer. At the same time, a hydrotropic agent reduces the viscosity of the substance to be processed. It can be selected from the group of polyfunctional alcohols. Thus, dialcohols with from 2 to 10, preferably from 2 to 6, especially from 2 to 4, carbon atoms per molecule can be employed. Also well suitable are their mono- and diethers as well as the mono- and diesters of these dialcohols. Examples thereof to be used more preferably include 1,2-propylene glycol, dipropylene glycol and butyl diglycol.

Optionally, the total composition may contain from 0 to 96% by weight of water as component D).

As component E), both inorganic and organic acids and/or their anhydride can be used in an amount of from 0 to 5% by weight, based on the total composition. Thus, for example, hydrochloric acid, sulfuric acid or phosphoric acid are used as inorganic acids. Alternatively, organic acids may be used, such as formic acid, acetic acid, glycolic acid, aldonic acid, such as gluconic acid, ascorbic acid, or uronic acid, such as glucuronic acid, and as polybasic acids, for example, oxalic acid, citric acid, or aldaric acids, such as glucaric or mucic acid. As an example of an anhydride of an organic acid, acetic anhydride may be mentioned.

Due to the fact that the amido-functional aminopolydiorganosiloxanes described have an extremely high viscosity and therefore can be processed into an aqueous formulation, especially emulsion, only with difficulty, another method according to the invention for the preparation of the above described formulations is characterized in that an amino-functional polydiorganosiloxane of general formula (IX)

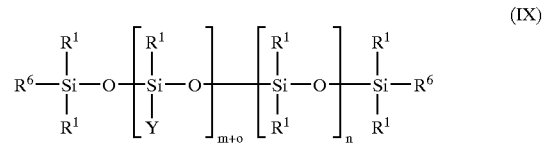

(IX)

wherein $R^1$ represents the same or different monovalent $C_1$ to $C_{18}$ hydrocarbon residues optionally substituted with fluoro, chloro or bromo, hydrogen atoms, $C_1$ to $C_{12}$ alkoxy or hydroxy residues or alkylglycol residues;

$R^6$ represents $R^1$ and/or a group Y;

Y represents a group of general formula (IV) and/or (V)

  (IV)

  (V)

wherein $R^3$ represents a divalent $C_1$ to $C_{18}$ hydrocarbon residue;

$R^4$ represents a hydrogen atom or a $C_1$ to $C_{10}$ alkyl residue optionally substituted with fluoro, chloro or bromo;

m has an average value of from 0.5 to 50;

n has an average value of from 10 to 1500;

o has an average value of from 0 to 50; and p represents the values 2, 3 or 4;

is combined with a hydroxycarboxylic acid capable of lactone formation and having at least 2 hydroxy groups and/or a lactone of a hydroxycarboxylic acid with at least 2 hydroxy groups, and components B) and D), optionally and/or C), at temperatures within a range of from 10 to 90° C. to form the amido-functional aminopolydiorganosiloxane according to the invention, and the milky to water-clear emulsion produced is optionally adjusted with component E) to weakly acidic pH values of <7.

Examples of $R^1$, $R^3$, $R^4$, $R^6$, m, n, o and p as well as components B), C) and E) are the same as described above.

To prepare the above described formulations, especially emulsions, a hydroxycarboxylic acid capable of lactone formation and having at least 2 hydroxy groups and/or a lactone of a hydroxycarboxylic acid with at least 2 hydroxy groups is reacted with the amino-functional polydiorganosiloxane described. An uronic, aldaric or aldonic acid capable of lactone formation and/or its lactone is preferably employed, gluconic acid and/or its lactone being more preferably employed. As known to the skilled person, the mentioned acids are in equilibrium with their lactones in an aqueous medium, so that, even if a hydroxycarboxylic acid with at least 2 hydroxy groups is employed, the related lactone will form and react with the amino-functional polydiorganosiloxanes described to form the amido-functional polydiorganosiloxanes according to the invention.

The formation of the emulsion can be effected at temperatures within a range of from 10 to 90° C. for 0.5 to 10 hours with uniform mixing. Preferred are temperatures within a range of from 20 to 70° C.

The reaction times to the formation of the formulations, especially emulsions, according to the invention depend on the temperatures applied. Thus, at very low temperatures, the reaction times are preferably from 5 to 10 hours, while at elevated temperatures, shorter reaction times, especially of between 0.5 and 5 hours, are naturally sufficient.

The invention further relates to the use of the amido-functional aminopolydiorganosiloxanes for the finishing of organic fibers and textiles in aqueous baths and application liquors, optionally together with conventional amino-functionally modified polydiorganosiloxanes to achieve a particularly soft and elegant feel of the products.

Particular mention may be made of the forced application by padding when employed on the padding machine, wherein both the dry-in-wet and wet-in-wet processes may be employed. Exhausting, spraying or foam application methods are also well suitable for applying the emulsions.

The significantly improved emulsion stability as compared with comparable conventional amino-functional polydiorganosiloxane emulsions, which is manifested especially on fast-running textile finishing machines, such as jets, is to be pointed out in particular.

White textile materials finished with the amido-functional aminopolydiorganosiloxane emulsions according to the invention exhibit a significantly reduced yellowing due to the elevated temperatures applied during the thermal stressing as compared with comparable conventional amino-functional polydiorganosiloxane emulsions.

In addition to these advantageous properties, the emulsions according to the invention have a high stability during application, even at pH values of $\geq 7$, so that the precipitation of silicone oil caused by coalescence and thus stains on the textile products are prevented even when extremely unfavorable conditions accumulate, for example, when high pH values and/or high liquor temperatures and/or very high shear stresses occur at the same time, as is usual, for example, on fast-running textile finishing machines.

An advantage over emulsions of cationically functionalized polydiorganosiloxanes having a similar property profile in terms of shear stability, yellowing and pH stability is the strikingly better anion stability of the formulations, especially emulsions, according to the invention. Emulsions of cationically functionalized polydiorganosiloxanes often tend to cause precipitations of silicone oil and transfer onto the textile products in the presence of, for example, carried-over anionic dye residues or anionic textile auxiliaries, which do not occur when the electrically neutral amido-functional aminopolydiorganosiloxane emulsions according to the invention are employed.

Of course, the amido-functional aminopolydiorganosiloxane emulsions according to the invention may at any time be combined with other chemicals usual in textile finishing, such as cellulose cross-linkers, cross-linking catalysts, textile softeners on the basis of fatty acid esters and/or fatty acid amine condensation products, feel-modifying polymer dispersions of various compositions and optical brighteners.

EXAMPLES

Example 1

1.38 g (0.00775 mol) of gluconic acid lactone was added to 36 g of a polydiorganosiloxane containing aminoethylaminopropyl groups and having a viscosity of 3300 mpa·s and a content of titrable nitrogen of w(N)=0.6%, and the mixture was added at room temperature to a mixture of 6 g of isotridecyl ethoxylate with 5 ethylene oxide units, 20 g of isotridecyl ethoxylate with 7 ethylene oxide units, and 70 g of water. This mixture was stirred at 60° C. for 90 minutes. The initially milky-white, low-viscous mixture became almost clear and significantly more viscous after a short time. Subsequently, the almost clear emulsion was again cooled to room temperature and diluted with another 66 g of water. The thus obtained microemulsion was adjusted to pH 6 with acetic acid.

Example 2

In 80 g of isopropanol, 4.56 g (0.0265 mol) of gluconic acid lactone was dissolved and added at room temperature to 300 g of a polydiorganosiloxane containing aminoethylaminopropyl groups and having a viscosity of 3300 mPa·s and a content of titrable nitrogen of w(N)=0.6%. The milky-white mixture was stirred at 80° C. for 4 hours. Subsequently, the solvent was distilled off to obtain a clear and extremely viscous yellowish oil with a content of titrable nitrogen of w(N)=0.47%. Infrared (neat on NaCl plates): amide bands at 1649 and 1541 cm$^{-1}$, amine band at 1600 cm$^{-1}$.

Example 3

2.74 g (0.0155 mol) of gluconic acid lactone was added to 36 g of a polydiorganosiloxane containing aminoethylaminopropyl groups and having a viscosity of 3300 mPa·s and a content of titrable nitrogen of w(N)=0.6%, and the mixture was added at room temperature to a mixture of 6 g of isotridecyl ethoxylate with 5 ethylene oxide units, 20 g of isotridecyl ethoxylate with 7 ethylene oxide units, and 70 g of water. This mixture was stirred at 60° C. for 90 minutes. The initially milky-white, low-viscous mixture became almost clear and significantly more viscous after a short time. Subsequently, the almost clear emulsion was again cooled to room temperature and diluted with another 66 g of water. The thus obtained microemulsion was adjusted to pH 6 with acetic acid.

Example 4

0.9 g (0.00505 mol) of gluconic acid lactone was added to 36 g of a polydiorganosiloxane containing aminoethylaminopropyl groups and having a viscosity of 3300 mPa·s and a content of titrable nitrogen of w(N)=0.6%, and the mixture was added at room temperature to a mixture of 6 g of isotridecyl ethoxylate with 5 ethylene oxide units, 20 g of isotridecyl ethoxylate with 7 ethylene oxide units, and 70 g of water. This mixture was stirred at 60° C. for 90 minutes. The initially milky-white, low-viscous mixture became almost clear and significantly more viscous after a short time. Subsequently, the almost clear emulsion was again cooled to room temperature and diluted with another 66 g of water. The thus obtained microemulsion was adjusted to pH 6 with acetic acid.

Example 5

1.38 g (0.00704 mol) of gluconic acid was added to 36 g of a polydiorganosiloxane containing aminoethylaminopropyl groups and having a viscosity of 3300 mPa·s and a content of titrable nitrogen of w(N)=0.6%, and the mixture was added at room temperature to a mixture of 6 g of isotridecyl ethoxylate with 5 ethylene oxide units, 20 g of isotridecyl ethoxylate with 7 ethylene oxide units, and 70 g of water. This mixture was stirred at 60° C. for 90 minutes. The initially milky-white, low-viscous mixture became almost clear and significantly more viscous after a short time. Subsequently, the almost clear, yellowish emulsion was again cooled to room temperature and diluted with another 66 g of water. The thus obtained microemulsion was adjusted to pH 6 with acetic acid.

Example 6

1.38 g (0.00784 mol) of ascorbic acid was added to 36 g of a polydiorganosiloxane containing aminoethylaminopropyl groups and having a viscosity of 3300 mPa·s and a content of titrable nitrogen of w(N)=0.6%, and the mixture was added at room temperature to a mixture of 6 g of isotridecyl ethoxylate with 5 ethylene oxide units, 20 g of isotridecyl ethoxylate with 7 ethylene oxide units, and 70 g of water. This mixture was stirred at 60° C. for 90 minutes. The initially milky-white, low-viscous mixture became almost clear and significantly more viscous after a short time. Subsequently, the bright yellow and almost clear emulsion was again cooled to room temperature and diluted with another 66 g of water. The thus obtained microemulsion was adjusted to pH 6 with acetic acid.

Comparative Example 1

36 g of a polydiorganosiloxane containing aminoethylaminopropyl groups and having a viscosity of 3300 mpa·s and a content of titrable nitrogen of w(N)=0.6% was added to a mixture of 6 g of isotridecyl ethoxylate with 5 ethylene oxide units, 20 g of isotridecyl ethoxylate with 7 ethylene oxide units, and 70 g of water. The turbid emulsion was diluted with another 68 g of water and adjusted to pH 6 with acetic acid to obtain a clear microemulsion.

Comparative Example 2

30 g of an amido-functional polydiorganosiloxane of the Dow Corning Company with the designation DC 2-8813 and a viscosity of 8000 mPa·s and a nitrogen content of w(N)=0.4% was added to a mixture of 7.2 g of $C_9$–$C_{11}$ alcohol with 7 ethylene oxide units, 10.8 g of isotridecyl ethoxylate with 5 ethylene oxide units, and 14 g of water. The mixture was stirred for 45 minutes until homogeneous and then cautiously diluted with 137.5 g of water. The turbid emulsion was adjusted to pH 6 with acetic acid to obtain a clear microemulsion.

Comparative Example 3

72 g of a cationically modified polydiorganosiloxane of the Goldschmidt Company with the designation Tegopren 6922 was admixed with 126 g of water with stirring and subsequently adjusted to pH 6 with acetic acid.

Evaluation in Terms of Application Technology

The emulsions obtained in Examples 1 to 6 and Comparative Examples 1 to 3 were tested with respect to the following properties:

a) Shear Stability in Acidic Medium

Of the polydiorganosiloxane emulsions to be examined, 400 ml of a solution with a concentration of 20 g/l was prepared in a 1000 ml beaker, heated to 40° C. and adjusted to pH 5 with acetic acid. Then, the liquor was stirred with a high-speed stirrer (24,000 rpm, Ultra Turrax supplied by Janke & Kunkel) for one minute. The appearance of the liquor after 24 hours was evaluated in terms of turbidity and depositions.

b) Shear Stability in Weakly Alkaline Medium

Of the polydiorganosiloxane emulsions to be examined, 400 ml of a solution with a concentration of 20 g/l was prepared in a 1000 ml beaker, heated to 40° C. and adjusted to pH 7.5 with 10% aqueous ammonia solution. Then, the liquor was stirred with a high-speed stirrer (24,000 rpm, Ultra Turrax supplied by Janke & Kunkel) for one minute. The appearance of the liquor after 24 hours was evaluated in terms of turbidity and depositions.

c) Anion Stability

In a 600 ml beaker, 200 ml of water was mixed with 6 g of polydiorganosiloxane emulsion and 20 g of a dye solution (0.48 g/l Solar Discharge Orange 3 LG and 0.24 g/l Indosol Rubinol SF-RGN, both products of the Clariant Company) and subsequently adjusted to pH 5 with 60% acetic acid. The liquor was stirred with a paddle agitator at 2000 rpm for 10 minutes and evaluated after 24 hours.

| Example | Shear stability, pH = 5 | Shear stability, pH = 7.5 | Anion stability |
|---|---|---|---|
| 1 | clear, no depositions | slightly turbid, no depositions | little depositions |
| 2 | opaque, no depositions | turbid, no depositions | little depositions |
| 3 | clear, no depositions | clear, no depositions | no depositions |
| 4 | opaque, no depositions | turbid, no depositions | little depositions |
| 5 | opaque, no depositions | turbid, no depositions | little depositions |
| 6 | opaque, no depositions | turbid, no depositions | little depositions |
| Comp. 1 | turbid, few depositions | highly turbid, heavy depositions | heavy depositions |
| Comp. 2 | opaque, no depositions | opaque, no depositions | little depositions |
| Comp. 3 | clear, no depositions | opaque, no depositions | heavy depositions |

Textile Finishing

An optically brightened cotton woven fabric (100 g/m$^2$) was padded with a liquor containing 20 g/l of the emulsions prepared according to Examples 1 to 9, squeezed to 70% liquor uptake and dried for 4 min at 120° C. This results in a very soft, comfortable, silky and elegant feel of the finished textile substrate. In addition, the thus finished fabric had a high resilience and improved anti-wrinkle properties. Subsequently, the following tests of application technology were performed:

a) Evaluation of Feel Property

To evaluate the feel property, an experienced team was compiled which evaluates the anonymized feel samples of the fabrics finished with the emulsions according to Examples 1 to 6 and Comparative Examples 1 to 3 using a hand test with a relative scale of from 0 to 10, a value of 10 representing the best soft feel property. As a comparative sample, an untreated fabric of the test series was included.

b) Tendency to Yellowing

After the described finishing with the emulsions according to Examples 1 to 6 and Comparative Examples 1 to 3, the above mentioned optically brightened cotton woven fabric (100 g/m²) was additionally dried for one minute at 180° C. The tendency to yellowing after drying at 120° C. and after treatment at 180° C. were evaluated. As a comparative sample, an untreated fabric of the test series was included.

The degree of yellowing was established with a color measuring device (Minolta Chromameter CR 331C) and noted as a b+ value. A decreasing tendency to yellowing means smaller b+ values.

| Applied emulsion | Soft feel property | Tendency to yellowing, b+ (120° C.) | Tendency to yellowing, b+ (180° C.) |
|---|---|---|---|
| 1 | 10 | 1.43 | 3.34 |
| 2 | 8 | 1.48 | 3.57 |
| 3 | 10 | 1.33 | 2.24 |
| 4 | 8 | 1.45 | 3.55 |
| 5 | 8 | 1.53 | 3.53 |
| 6 | 7 | 1.52 | 3.68 |
| Comp. 1 | 8 | 1.66 | 4.03 |
| Comp. 2 | 6 | 1.15 | 2.58 |
| Comp. 3 | 5 | 1.02 | 1.90 |
| untreated | 0 | 0.65 | 1.49 |

What is claimed is:

1. Amido-functional aminopolydiorganosiloxanes of general formula (I)

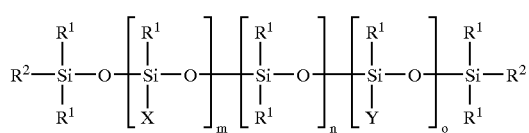

wherein $R^1$ represents the same or different monovalent $C_1$ to $C_{18}$ hydrocarbon residues optionally substituted with fluoro, chloro or bromo, hydrogen atoms, $C_1$ to $C_{12}$ alkoxy or hydroxy residues or alkylglycol residues;

$R^2$ represents $R^1$ and/or one of the groups X and/or Y;

X represents a group of general formula (II) and/or (III)

—$R^3$NZ$R^4$ (II)

—$R^3$N$R^5$(CH$_2$)$_p$NZ$R^4$ (III)

wherein $R^3$ represents a divalent $C_1$ to $C_{18}$ hydrocarbon residue;

$R^4$ represents a hydrogen atom or a $C_1$ to $C_{10}$ alkyl residue optionally substituted with fluoro, chloro or bromo;

Z is derived from hydroxycarboxylic acids and oxidized mono- and disaccharides, each having at least 2 hydroxy groups;

$R^5$ represents a hydrogen atom and/or Z;

Y represents a group of general formula (IV) and/or (V)

—$R^3$NH$R^4$ (IV)

—$R^3$NH(CH$_2$)$_p$NH$R^4$ (V)

wherein $R^3$ and $R^4$ have the above mentioned properties;

m has an average value of from 0.5 to 50;

n has an average value of from 10 to 1500;

o has an average value of from 0 to 50; and p represents the values 2, 3 or 4;

with the proviso that the ratio of m to o is within a range of from 10:1 to 0.1:1.

2. The amido-functional aminopolydiorganosiloxanes according to claim 1, characterized in that Z is derived from uronic, aldaric and aldonic acids of general formulas (VI), (VII) and (VIII), respectively:

O=CH—[CH(OH)]$_s$—CO— (VI)

HOOC—[CH(OH)]$_s$—CO— (VII)

HOCH$_2$—[CH(OH)]$_s$—CO— (VIII), with $2 \leq s \leq 10$.

3. The amido-functional aminopolydiorganosiloxanes according to claim 1, characterized in that Z is derived from gluconic acid.

4. The amido-functional aminopolydiorganosiloxanes according to claim 1, characterized in that the ratio of m to o is within a range of from 5:1 to 1:1.

5. A process for the preparation of amido-functional aminopolydiorganosiloxanes according to claim 1, wherein an amino-functional polydiorganosiloxane of general formula (IX)

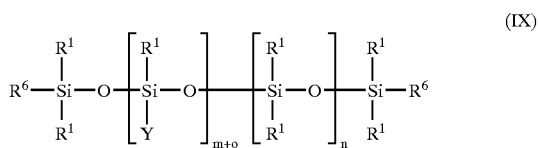

wherein $R^1$ represents the same or different monovalent $C_1$ to $C_{18}$ hydrocarbon residues optionally substituted with fluoro, chloro or bromo, hydrogen atoms, $C_1$ to $C_{12}$ alkoxy or hydroxy residues or alkylglycol residues;

$R^6$ represents $R^1$ and/or a group Y;

Y represents a group of general formula (IV) and/or (V)

—$R^3$NH$R^4$ (IV)

—$R^3$NH(CH$_2$)$_p$NH$R^4$ (V)

wherein $R^3$ represents a divalent $C_1$ to $C_{18}$ hydrocarbon residue;

$R^4$ represents a hydrogen atom or a $C_1$ to $C_{10}$ alkyl residue optionally substituted with fluoro, chloro or bromo;

m has an average value of from 0.5 to 50;

n has an average value of from 10 to 1500;

o has an average value of from 0 to 50; and p represents the values 2, 3 or 4;

with the proviso that the ratio of m to o is within a range of from 10:1 to 0.1:1;

is reacted, optionally in the presence of a solvent, with a lactone of a hydroxycarboxylic acid with at least 2 hydroxy groups at temperatures within a range of from 10 to 150° C.

6. The process according to claim 5, characterized in that a molar excess of said hydroxycarboxylic acid and/or lactone of said hydroxycarboxylic acid of at least 10% by weight, especially from 10 to 500% by weight, preferably from 20 to 200% by weight, is employed, based on said amino-functional polydiorganosiloxane.-

7. Formulations containing, based on the total composition:
A) from 2 to 80% by weight of one or more amido-functional aminopolydiorganosiloxanes of general formula I according to claim 1;
B) from 2 to 40% by weight of an emulsifier;
C) from 0 to 20% by weight of a hydrotropic agent; and
D) from 0 to 96% by weight of water.

8. The formulation according to claim 7, further containing, based on the total composition:
E) from 0 to 5% by weight of inorganic or organic acid and/or its anhydride.

9. A method for the preparation of a formulation containing amido-functional aminopolydiorganosiloxanes claim 1, according to claim 7, characterized in that an amino-functional polyorganosiloxane of general formula (IX)

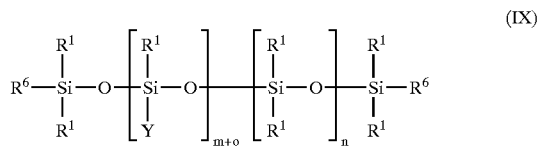

wherein $R^1$ represents the same or different monovalent $C_1$ to $C_{18}$ hydrocarbon residues optionally substituted with fluoro, chloro or bromo, hydrogen atoms, $C_1$ to $C_{12}$ alkoxy or hydroxy residues or alkylglycol residues;
$R^6$ represents $R^1$ and/or a group Y;
Y represents a group of general formula (IV) and/or (V)

—$R^3NHR^4$ (IV)

—$R^3NH(CH_2)_pNHR^4$ (V)

wherein $R^3$ represents a divalent $C_1$ to $C_{18}$ hydrocarbon residue;
$R^4$ represents a hydrogen atom or a $C_1$ to $C_{10}$ alkyl residue optionally substituted with fluoro, chloro or bromo;
m has an average value of from 0.5 to 50;
n has an average value of from 10 to 1500;
o has an average value of from 0 to 50; and
p represents the values 2, 3 or 4;
is combined with a hydroxycarboxylic acid capable of lactone formation and having at least 2 hydroxy groups and/or a lactone of a hydroxycarboxylic acid with at least 2 hydroxy groups, and components B) and optionally C), D) and/or E) at temperatures within a range of from 10 to 90° C., and the milky to water-clear emulsion produced is optionally adjusted with component E) to pH values of <7.

10. In a process for finishing inorganic fibers and textiles in aqueous baths and application liquors wherein the improvement comprises the amido-functional aminopolydiorganosiloxanes of general formula I according to claim 1.

11. The process according to claim 10 for the finishing of inorganic fibers and textiles wherein the improvement further comprises the optional inclusion of amino-functionally modified polydiorganosiloxanes, as a forced application by padding when employed on the padding machine, or in an exhausting, spraying or foam application on fast-running textile finishing machine.

* * * * *